United States Patent
Kransmo

(10) Patent No.: US 6,597,911 B1
(45) Date of Patent: Jul. 22, 2003

(54) SYSTEM, METHOD, AND APPARATUS FOR CELL SEARCHING IN A NEXT GENERATION OVERLAY OF A PREEXISTING NETWORK

(75) Inventor: Jan Kransmo, Plano, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/322,365

(22) Filed: May 28, 1999

(51) Int. Cl.[7] .................................................. H04Q 7/20
(52) U.S. Cl. ........................ 455/436; 455/443; 455/444; 455/437; 455/438; 455/449
(58) Field of Search ................................ 455/436–440, 455/442–444, 403, 448, 449; 370/320, 324, 331, 441

(56) References Cited

U.S. PATENT DOCUMENTS

| | | | |
|---|---|---|---|
| 5,268,933 A | * 12/1993 | Averbuch | 370/331 |
| 5,517,675 A | * 5/1996 | O'Connor et al. | 370/335 |
| 5,722,073 A | 2/1998 | Wallstedt et al. | 455/437 |
| 5,896,368 A | * 4/1999 | Dahlman et al. | 370/335 |
| 5,915,221 A | * 6/1999 | Sawyer et al. | 455/437 |
| 5,974,319 A | * 10/1999 | Kotzin et al. | 340/477 |
| 5,983,102 A | * 11/1999 | Gozes | 455/432 |
| 6,014,565 A | * 1/2000 | Bonta | 455/437 |
| 6,101,175 A | * 8/2000 | Schorman et al. | 370/331 |
| 6,112,089 A | * 8/2000 | Satarasinghe | 370/332 |
| 6,173,181 B1 | * 1/2001 | Losh | 370/329 |
| 6,246,673 B1 | * 6/2001 | Tiedemann et al. | 370/333 |
| 6,308,066 B1 | * 10/2001 | Ranta et al. | 370/331 |
| 6,339,590 B2 | * 1/2002 | Kim | 370/331 |
| 6,389,138 B1 | * 5/2002 | Li et al. | 370/209 |
| 2002/0037726 A1 | * 3/2002 | Czaja et al. | 455/442 |

OTHER PUBLICATIONS

ETSI, *Digital Cellular Telecommunications System (Phase 2+); Mobile Radio Interface Layer 3 Specification*, Draft, EN 300 940 V6.2.0 (Dec. 1998).

* cited by examiner

Primary Examiner—Nay Maung
Assistant Examiner—Edan Orgad
(74) *Attorney, Agent, or Firm*—Jenkens & Gilchrist, P.C.

(57) ABSTRACT

A system, method, and apparatus for performing a handover for mobile station are presented. Where a mobile station in a preexisting cellular network approaches the service area of a next generation network, the serving base station transmits a cell neighbor list to the mobile station. The cell neighbor list includes nearby base stations within the preexisting cellular network as well as the next generation network. The mobile station can then measure the signal strength on the handover measurement channels of the cells in the next generation network. A method and associated apparatus for measuring the handover measurement channels of base stations in a next generation network using Code Division Multiple Access (CDMA), are also presented.

13 Claims, 4 Drawing Sheets

SYSTEM, METHOD, AND APPARATUS FOR CELL SEARCHING IN A NEXT GENERATION OVERLAY OF A PREEXISTING NETWORK

BACKGROUND OF THE INVENTION

1. Technical Field of the Invention

The present invention relates to cellular telecommunications networks and, in particular, to a system, method, and apparatus for a cell search within a telecommunications network.

2. Description of Related Art

Reference is now made to FIG. 1 wherein there is illustrated an exemplary cellular telephone network 100. An arbitrary geographic region (hereinafter "the service area") 105 is divided into a plurality of contiguous cells 110 schematically represented by hexagons. The cells 110 are then grouped into clusters 115 (outlined in bold to ease recognition). For example, in the frequency plan of FIG. 1, each cluster 115 includes seven cells 110(1)–110(7). It will, of course, be understood that each cluster 115 may have more or fewer cells 110 as required by the selected frequency plan. Each cell 110(1)–110(7) is associated with a base station 120 which provides telephone service to mobile stations 125 using traffic channels. Each cell 110 is also associated with a control channel.

As a subscriber having a mobile station 125 operating within the cellular telephone network 100 moves about the service area 105, the subscriber is likely to leave the coverage area of one cell and enter the coverage area of another cell. If the mobile station 125 is turned on but not at that time engaged in a call, registration of the mobile station's 125 presence within a new cell 110 is made, as is understood in the art.

When the subscriber is engaged in a call, however, the transfer to the new cell 110 is a more complicated process than a mere registration. In this instance, not only must the mobile station's 125 presence within the coverage area of the new cell 110 be detected, confirmed and registered, but also the communications link with the mobile station 125 carrying the telephone call must be switched from one base 120 station in the prior cell 110 to another base station 120 in the new cell 110 as the mobile station 125 moves and responsibility for the link is transferred to that new cell 110. The process for performing this action is commonly referred to as "handover" or "hand-off". In order to preserve the mobility advantage provided by cellular telephone networks, it is vitally important that the handover of calls in a cellular telephone network occur timely, efficiently, accurately and transparently.

Under the Global System for Mobile Communications (GSM) standard, mobile stations 125 make signal strength measurements within the current cell 110, as well as with respect to neighboring cells 110. The channels measured by the mobile station 125 are identified in a list provided to the mobile station 125 by the cellular network 100. The listed channels include handover measurement channels (usually the control channel) for cells 110 which are potential targets for a handover. The measurements are reported back to the serving base station 120. At the same time, the serving base station 120 measures signal strength of received mobile station 125 transmissions. These mobile 125 and base station 120 measurements are processed by a base station controller (BSC) 130 to determine whether a handover is needed, and also to identify to which cell such handover should be made.

Where a handover is needed, the base station controller 130 sends a handover command to the mobile station 125 including information on the channel to be used in the new cell 110 to carry the call. The mobile station 125 then tunes to the channel and continues the conversation. The previously used channel is then released and the BSC 130 transfers the call to the new base station 120 in the new cell 110.

It is axiomatic that technological innovation creates for more advanced telecommunication networks and equipment which deliver more and better services to mobile subscribers than preexisting cellular networks, such as the cellular telephone network 100 shown in FIG. 1. The more advanced networks are often referred to as next generation networks. For example, analog American Mobile Phone Service (AMPS) networks are often referred to as first generation networks, while digital networks, such as Digital-AMPS (D-AMPS) or Global System for Mobile Communications (GSM) are referred to as second generation networks. The emerging Personal Communications Systems (PCS) with Code Division Multiple Access (CDMA), for example, are referred to as third generation networks.

Transition from a preexisting cellular network 100 to a next generation network is often performed in an overlay fashion. In an overlay, the next generation network is gradually deployed alongside the preexisting cellular network. Although the infrastructure of the preexisting cellular network can be replaced wholly by the next generation network, there are, of course, a number of disadvantages associated with this more abrupt approach. For example, mobile stations designed to operate with the preexisting cellular network could be rendered useless, resulting in customer dissatisfaction, and possibly inducing customers to switch to a network maintained by a different operator.

Accordingly, overlaying a next generation network over a preexisting cellular network permits the network operator to gradually phase out the preexisting cellular network. It is noted, however, that next generation networks initially include a limited number of cells in a smaller service area. To promote acceptance of the next generation network, network operators often market dual-mode mobile stations 125, illustrated in FIG. 2. Dual-mode mobile stations 125 allow the subscriber to utilize both the preexisting cellular network as well as the next generation network. The dual-mode mobile station 125 selects a cell in the next generation network when the mobile station 125 is within an area served by the next generation network. However, when the mobile station 125 is in an area that is not served by the next generation network, the dual-mode mobile station registers with the preexisting cellular network 100.

As a subscriber having a mobile station moves from outside the service area of the next generation service area to within the service area, it is desirable for the mobile station 125 to deregister with the preexisting cellular network 100 and register with the next generation network, notwithstanding the fact that the dual-mode mobile station 125 is also within the service area 105 of the preexisting cellular network 100. If the dual-mode mobile station 125 is not engaged in a call at the time, the mobile station 125 deregisters with the preexisting cellular network and registers with the next generation network. However, when the subscriber is engaged in a call, a handover operation must be performed with a cell of the next generation network. Present networks, however, do not provide for inclusion of handover measurement channels for cells in different generation networks. Therefore, a handover from a preexisting cellular network 100 to a next generation network or vice versa is slow, resulting in undesirably long speech interruptions.

Accordingly, it would be advantageous if control channels from different generation networks could be provided to the mobile station.

SUMMARY OF THE INVENTION

The present invention is directed to a system, method and apparatus for performing a handover for a mobile station in a mobile telecommunications system including a preexisting cellular network and a next generation cellular network. A cell neighbor list, which includes cells within the preexisting cellular network as well as the next generation network, is transmitted from the serving base station to the mobile station. Responsive thereto, the mobile station measures the signal strength of handover measurement channels associated with the cells in the cell neighbor list, including cells from the next generation network.

BRIEF DESCRIPTION OF THE DRAWINGS

A more complete understanding of the system, method, and apparatus of the present invention may be acquired by reference to the following Detailed Description when taken in conjunction with the accompanying Drawings wherein.

DETAILED DESCRIPTION OF PREFERRED EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
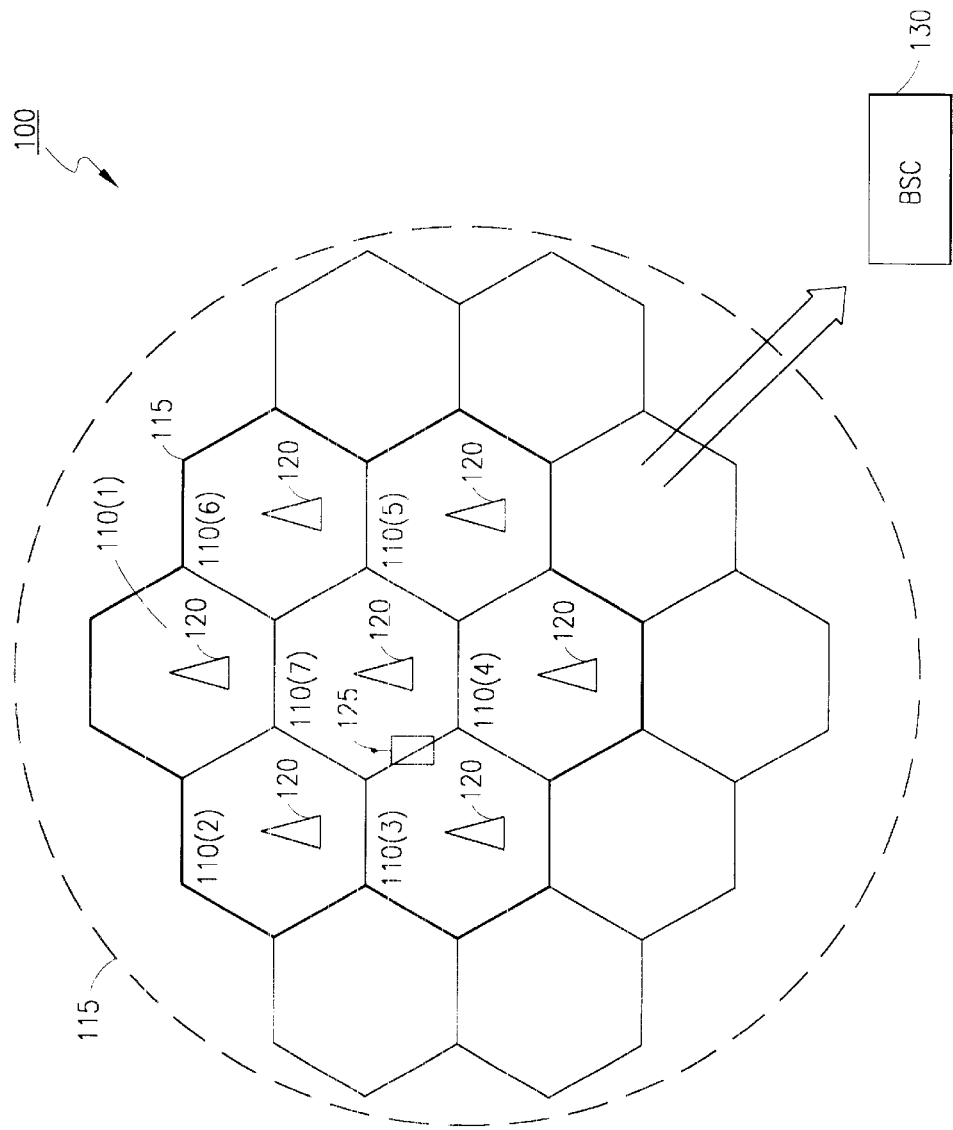
FIG. 1 is a schematic diagram of an exemplary cellular network.
Figure 2:
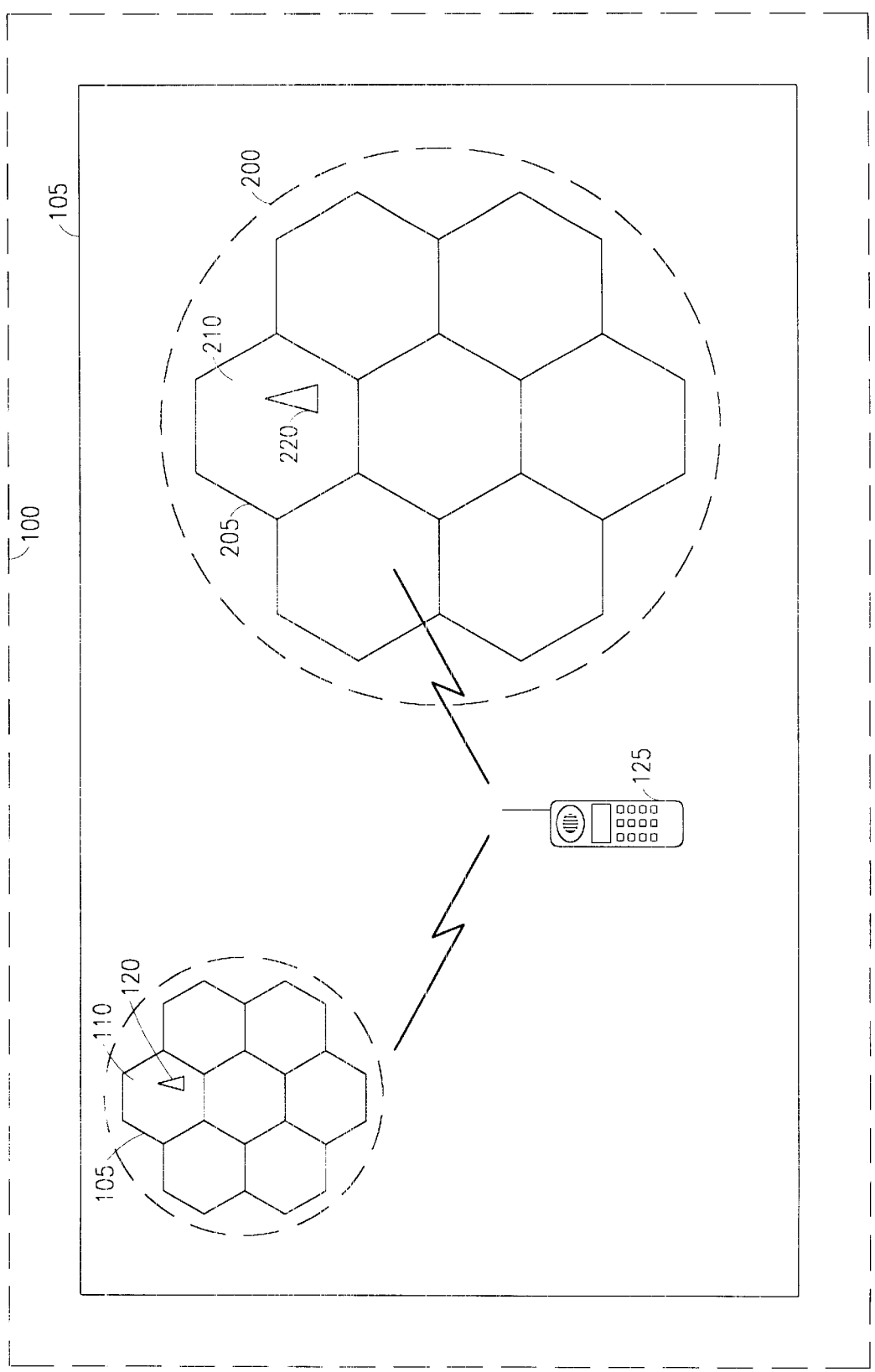
FIG. 2 is a schematic diagram of a next generation network overlaying a preexisting cellular network in which the present invention can be implemented.

Referring again to FIG. 2, there is illustrated a next generation cellular network 200 overlaying the cellular network 100 of FIG. 1. As discussed hereinabove, transition from the preexisting cellular network 100 to the next generation network 200 is often performed in an overlay fashion, wherein the next generation network 200 is gradually deployed alongside the preexisting cellular network 100. The next generation network 200 initially includes a limited number of cells 210 with associated base stations 220 in a smaller service area 205. To promote acceptance of the next generation network, network operators often market dual-mode mobile stations 125 which utilize both the preexisting cellular networks 100 as well as the next generation network 200. In a presently preferred embodiment, the dual-mode mobile station 125 selects a cell 210 in the next generation network 200 when the mobile station is within an area 205 served by the next generation network. However, when the mobile station 125 is in an area that is not served by the next generation network 200, the dual-mode mobile station registers with the preexisting cellular network 100.

As a subscriber having a mobile station moves from outside the service area 205 of the next generation service area to within the service area 205, it is desirable for the mobile station to deregister with the preexisting cellular network 100 and register with the next generation network 200, notwithstanding the fact that the dual-mode mobile station 125 is also within the service area 105 of the preexisting cellular network 100. As discussed, th next generation network 200 may have nehanced capabilities and features desirous of the dual-mode mobile station user over that of the preexisting network 100. Accordingly, when the subscriber is engaged in a call, a handover operation should be performed with a cell 210 of the next generation network 200.

Figure 3:
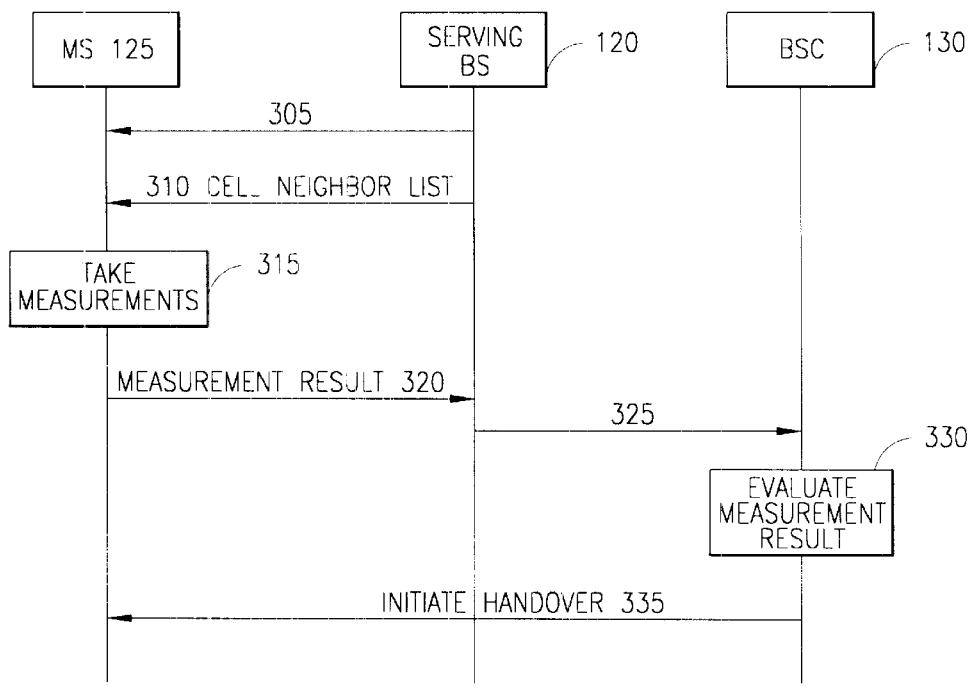
FIG. 3 is a signal flow diagram of a mobile assisted handover task performed by a preexisting cellular network, in accordance with the present invention.

Referring now to FIG. 3, there is illustrated a signal flow diagram of a mobile assisted handover (MAHO) task performed by the preexisting cellular network 100 in accordance with the present invention. During an ongoing call (signal 305), the mobile station 125 periodically monitors handover measurement channels (often the control channels) of base stations 120 located in close proximity to the base station 120 in which the call (signal 305) is presently pending (the serving base station 120). The handover measurement channels are preferably contained in a cell neighbor list of the cell 110 in which the call is pending. The cell neighbor list is transmitted (signal 310) to the mobile station 125 by the serving base station 120. In addition to handover measurement channels for nearby cells 110 within the preexisting cellular network 100, the cell neighbor list (signal 310) contains an identification of handover measurement channels for nearby cells 210 in the next generation network 200.

The mobile station 125, upon receipt of the cell neighbor list (signal 310), measures (action 315) the received signal strength on the handover measurement channels identified in the cell neighbor list (signal 310), as well as the channel used for the pending phone conversation (current channel) (signal 305). The measurement results are then transmitted (signal 320) to the serving base station 120, which forwards the measurements to the serving BSC 130 (signal 325).

The BSC 130, upon receipt of the results, evaluates the measurement results (action 330) to determine if the received signal strength on a handover measurement channel exceeds the received signal strength on the current channel by a predetermined threshold. Where the BSC 130 detects that the received signal strength on a handover measurement channel exceeds the received signal strength on the current channel by a predetermined threshold, the BSC 130 initiates a handover (signal 335) to the cell 110/210 with the better received signal strength.

The handover measurement channels for nearby cells 210 in the next generation network 200 can be identified in a number of ways in the cell neighbor list (signal 310). Where the next generation network utilizes Code Division Multiple Access (CDMA) for communications, for example, the cell neighbor list includes an identification of the CDMA network 200, an identification of any nearby CDMA cells 210, the broadband frequency, the primary synchronization channel for the CDMA network 200, and secondary synchronization channels and pilot codes for handover measurement channels used by the CDMA cells 210.

Figure 4:
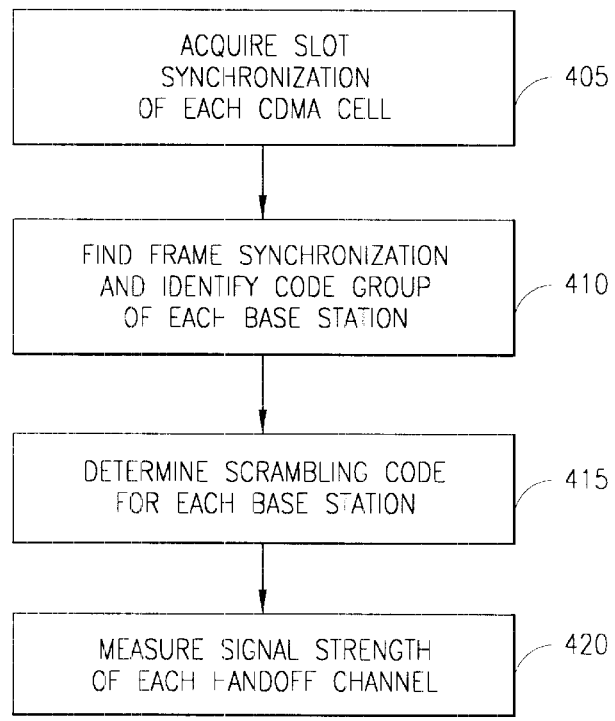
FIG. 4 is a flow diagram describing the operation of the mobile station measuring the signal strengths of cells in a next generation cellular network using CDMA.

Referring now to FIG. 4, there is illustrated a flow diagram describing operation of the mobile station 125 measuring the signal strengths of cells 210 in a next generation cellular network 200 using CDMA. The operation described can be performed in conjunction with the MAHO described in FIG. 3 (e.g., action 315). When the MS 125 receives cells 210 of the next generation network 200 (now referred to as CDMA cells 210) in the cell neighbor list (signal 310), the MS 125 uses the primary synchronization channel to acquire the slot synchronization of each reported CDMA cell 210 (step 405). This can be done with a single matched filter (or similar device) matched to the primary synchronization code, which is common to all of the CDMA cells 210. The output of the matched filter will have peaks for each CDMA cell 210 and associated base station 220 nearby the MS 125. The timing of each base station 220 can be ascertained by detecting the position of each peak.

After determining the timing of each base station 220, the mobile station uses the secondary synchronization channel to find frame synchronization and identify the code group of each base station (step 410). The foregoing is achieved by correlating the received signals at the positions of the secondary synchronization codes for each listed CDMA cell 210 with all possible secondary synchronization codes. The position of the secondary synchronization code is known from the time offset between the primary synchronization code and the secondary synchronization codes ascertained during step 405. Furthermore, the unmodulated primary synchronization channel can be used as a phase reference in the demodulation of the modulated synchronization channel.

The correlation with the different secondary synchronization codes gives different demodulated sequences. To achieve frame synchronization, the demodulated sequences should be correlated with the different cyclic shifts of the secondary synchronization channels' modulation sequences. By identifying the code/shift pair that gives the maximum correlation value, the code group as well as the frame synchronization is determined.

The MS 125 then determines the exact scrambling code for the handover measurement channel for the base stations 210 of each CDMA cell 210 (step 415). The scrambling code is identified through symbol-by-symbol correlation over a primary common control physical channel (CCPCH) with all the scrambling codes within each code group identified during step 410. After each of the scrambling codes have been identified, cell specific handover measurement channel information can be read. With the aforementioned handover measurement channel information, the MS 125 measures (step 420) the signal strength of each handover measurement channel associated with each CDMA cell 210 identified in the cell neighbor list (signal 310).

In addition to use in the MAHO task described in FIG. 3, the operation for measuring the signal strength of CDMA cells 210 described in FIG. 4 can also be used by the MS 125 when the MS 125 is in idle mode in the preexisting cellular network 100 to determine whether to register with the next generation network 200.

Figure 5:
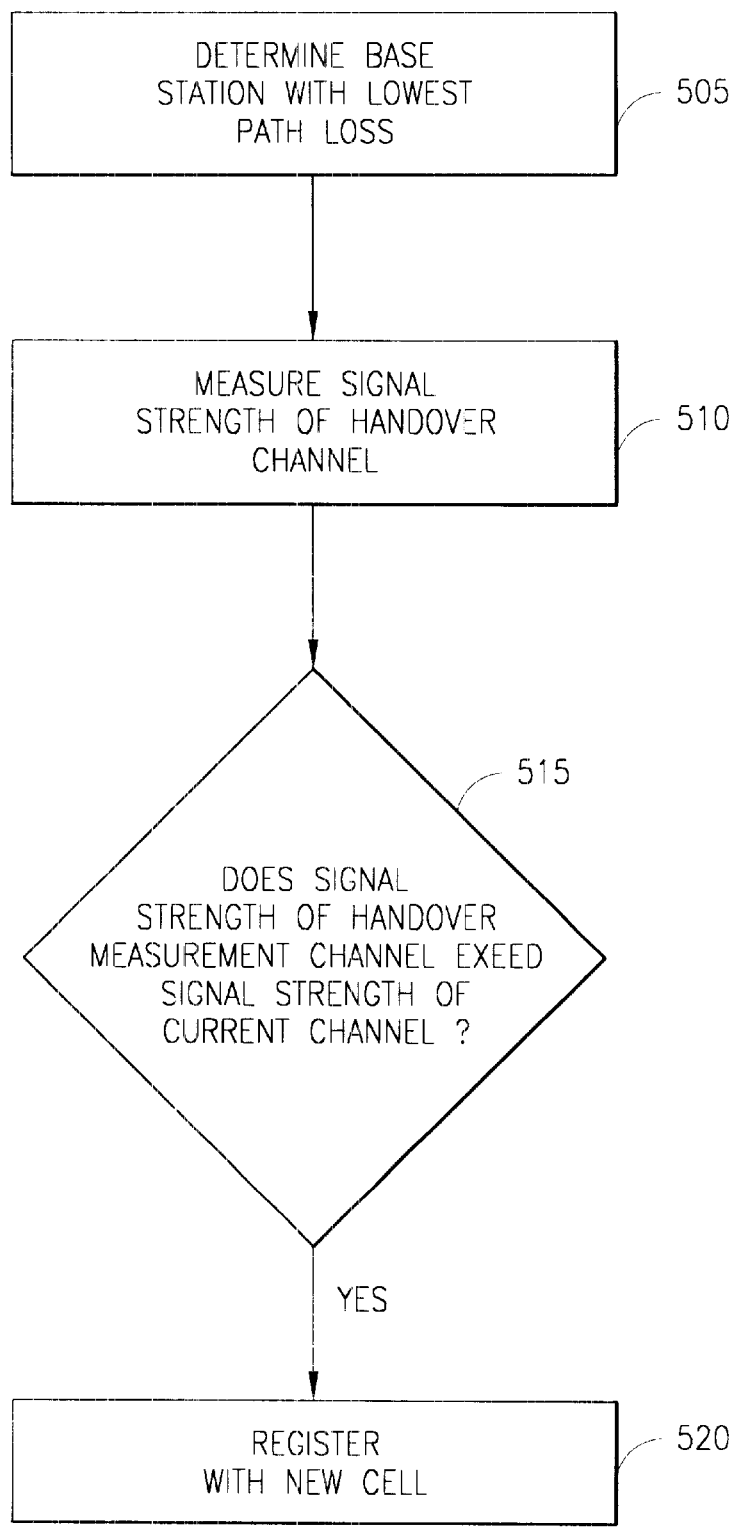
FIG. 5 is a flow diagram describing operation of a mobile station in idle mode measuring signal strengths in accordance with the present invention.

Referring now to FIG. 5, there is illustrated a flow diagram of the MS 125 in idle mode measuring signal strengths in accordance with the present invention. When the MS 125 is in idle mode, the MS 125 determines the nearby base station 110/210 with the lowest path loss (step 505). Where the nearby base station 110/210 with the lowest path loss is associated with a CDMA cell 210, the operation of FIG. 4 with slight modification can be used to measure the signal strength on the handover measurement channel (step 510). Acquisition of slot synchronization for the base station 210 with the lowest path loss is achieved by detecting the position of the strongest peak by the matched filter. After measuring the signal strength on the handover measurement channel of the CDMA cell 210, the signal strength can be compared (step 515) to the signal strength on the control channel of the serving base station 110. Where the CDMA cell 210 has a stronger signal strength than the control channel of the serving base station 110, the MS 125 registers with the CDMA cell 210 (step 520) in the next generation network 200.

It should be understood that the principals of the present invention are applicable in a variety of contexts, particularly where a later version or enhancement or new methodology is employed which is partially or wholly incompatible to existing systems of that time. In other words, the present invention is intended to apply to succeeding technological innovations employing the concepts herein and not just to the particular migration to third generation telecommunications systems at present. Accordingly, the term "preexisting cellular network" is intended to apply to the technology preceding the "next generation" cellular network which supplants the preexisting cellular network, which, in due course is itself supplanted by later advancements.

Although the invention has been described with a certain degree of particularity, it should be recognized that elements thereof may be altered by persons skilled in the art without departing from the spirit and scope of the invention. For example, although examples have been demonstrated where the next generation network utilizes CDMA, it should be understood that the next generation is not limited to a CDMA network and can comprise other networks, including, but not limited to, GSM and D-AMPS networks. Therefore, the invention is limited only by the following claims and their equivalents.

What is claimed is:

1. In a mobile telecommunications system comprising a preexisting cellular network associated with a first service location area and a first plurality of cells, each of said first plurality of cells being served by a particular one of a first plurality of base stations, and a next generation cellular network associated with a second service location area and a second plurality of cells, each of said second plurality of cells being served by a particular one of a second plurality of base stations, said second service location area partially overlapping said first service location area, a method for performing a handover for a mobile station served by a particular one of said first plurality of base stations, said method comprising the steps of:

receiving a cell neighbor list from said particular one of said first plurality of base stations serving said mobile station at said mobile station upon entering said second service location area, said cell neighbor list including an indicator identifying at least one of said second plurality of base stations; and measuring the signal strength of a handover measurement channel associated with said at least one of said second plurality of base stations identified by said indicator by said mobile station.

2. The method of claim 1, wherein said preexisting cellular network comprises a Global System for Mobile Communications network.

3. The method of claim 1, wherein said preexisting cellular network comprises a Digital American Mobile Phone Service network.

4. The method of claim 1, wherein said next generation network comprises a code division multiple access network.

5. The method of claim 4, wherein said indicator includes at least one parameter selected from a group consisting of:

an identification associated with said next generation network;

an identification associated with said at least one of said second plurality of cells;

a broadband frequency associated with said next generation network;

a primary synchronization channel associated with said next generation network;

a secondary synchronization channel associated with said at least one of said second plurality of cells; and a pilot code associated with said at least one of said second plurality of cells.

6. The method of claim 4, wherein said step of measuring further comprises the step of:

determining a scrambling code used by a handover measurement channel associated with said at least one of said second plurality of cells.

7. The method of claim 6, wherein said step of measuring further comprises the steps of:

acquiring slot synchronization with said at least one of said second plurality of cells; and identifying a code group associated with said at least one of said second plurality of cells.

8. A preexisting cellular network for handing off a mobile station served by said preexisting cellular network to a recipient cell in a next generation cellular network, said next generation cellular network having a service location area partially overlapping a service location area of said preexisting cellular network, said preexisting cellular network comprising:

a base station serving said mobile station, said base station transmitting a cell neighbor list to said mobile station upon a determination that said mobile station is entering said service location area of said next generation cellular network, said cell neighbor list including an indicator identifying said recipient cell in said next generation cellular network; and a base station controller for receiving measurement results for said recipient cell.

9. The preexisting cellular network of claim 8, wherein said preexisting cellular network further comprises a Global System for Mobile Communications.

10. The preexisting cellular network of claim 8, wherein said preexisting cellular network further comprises an American Mobile Phone Services network.

11. The preexisting cellular network of claim 8, wherein said next generation network comprises a code division multiple access network.

12. The preexisting cellular network of claim 11, wherein said indicator is selected from a group consisting of:

an identification associated with said next generation network;

an identification associated with said recipient cell;

a broadband frequency associated with said next generation network;

a primary synchronization channel associated with said next generation network;

a secondary synchronization channel associated with said recipient cell; and a pilot code associated with said recipient cell.

13. A mobile station operable in a preexisting cellular network in accordance with a first mode, and operable in a next generation network in accordance with a second mode, said next generation network having a service location area partially overlapping a service location area of said preexisting cellular network, said mobile station comprising:

a filter for acquiring slot synchronization with a base station forming a portion of said next generation network upon entering said service location area of said next generation network, said portion including a plurality of cells;

code identification means for identifying a code group associated with at least one of said plurality of cells; and code determining means for determining a scrambling code used by a handover measurement channel associated with said at least one of said plurality of cells.

* * * * *